United States Patent Office

3,534,385
Patented Oct. 13, 1970

3,534,385
PROCESS AND APPARATUS FOR MICRO-MACHINING AND TREATMENT OF MATERIALS
Raymond Bernard René Castaing and Marc Pierre Robert Bernheim, Paris, France, assignors to Etablissement Public Centre National de la Recherche Scientifique, Paris, France, a corporation of France
Filed Dec. 6, 1966, Ser. No. 599,492
Claims priority, application France, Dec. 8, 1965, 41,453
Int. Cl. B23k 15/00
U.S. Cl. 219—121                                7 Claims

ABSTRACT OF THE DISCLOSURE

An apparatus utilizing a single ion beam passing through a scale model to machine defined areas of a workpiece and to simultaneously observe the machining.

---

This invention relates to processes and devices used to effect very fine and very precise machining operations, also called micro-machinings or treatments of materials; more particularly it concerns such processes and devices which employ ionic bombardment.

It is known that present micro-machining processes use principally thermal evaporation of materials under the effect of a very intense electron beam.

With these processes, it is necessary to have large electronic densities available in order to obtain a sufficiently intense heating of the material to be machined. Furthermore, carrying out a sufficiently fine machining operation requires setting very precise boundary limits of the heating zone, which in the final analysis, implies obtaining very high electronic density gradients.

These two requirements concerning the fineness of the beam and its large electronic density are unfortunately contradictory and the fineness of the machining obtained by these processes is necessarily limited.

In order to prevent these difficulties, indirect methods of machining have been employed making it possible to use electronic and also ionic beams having very low densities. The method consists then in producing, by means of these beams, insulating deposits on the samples or pieces to be treated which result particularly from a superficial "contamination" of the latter and in effecting then an electrolytic deposit on the "uncontaminated" conducting areas.

Insulating deposits according to this method, may be made by points in forming an ionic or electronic point spot on the sample or piece to be machined and in displacing the latter according to the needs of the machining operation.

Another method consists in placing a model in the ionic or electronic path, i.e. a perforated support material reproducing the form of the machining operation to be performed, and in forming the image of this model on the sample or piece.

This latter method which is related to photo-engraving, is long and difficult as it requires two successive operations. Furthermore there are difficulties in the controlling focusing of the ionic or electronic image formed on the sample.

One method consists in replacing the sample with a grid that partially intercepts the ionic or electronic beam and in forming on the output side of the latter, by means of an appropriate system of corpuscular optic the superimposed images of the grid and of the model on a fluorescent screen.

This procedure involves great operating difficulties; it requires, in particular, that the surface of the sample to be treated be placed very accurately at the same level as that previously occupied by the grid.

Another method consists in using an ionic beam capable of locally pulverising a point in the sample. The operation is then effected by moving the sample in a parallel direction to itself depending on the nature of the machining operation to be effected. This method involves difficulty as far as very precise mechanical displacements are concerned. Furthermore in devices constructed up to now, focusing of the point ionic spot formed on the sample can only be verified by the results of the machining obtained. No control or checking whatsoever of this focusing operation is allowed for during bombardment.

The object of this invention is to provide a process for micro-machining and treatment of materials that prevents the above enumerated disadvantages. The object of the invention is also a device for carrying the process into effect.

The process consists essentially in forming the ionic image of a model on the sample or piece to be treated so as to reproduce on the latter the form of the machining to be effected, by using an ionic beam capable of producing through bombardment a cathodic sputtering of the material making up the sample, and in using the secondary electrons, emitted by the sample under the effect of bombardment to form on the input side of the latter an electronic image, capable of being visualized, of the parts of said sample subjected to bombardment.

The device comprises essentially, arranged successively and axially of an ion gun, a condenser capable of producing convergence the ion beam originating from said gun, a model "illuminated" by said beam, a sample support, a system of electron optics placed on the input side of said support and consisting of an ion-electron line converter capable of forming, on a fluorescent screen, an electronic image of the sample areas subjected to bombardment by focusing of secondary electrons emitted by the latter, a magnetic projector being provided, in addition, in order to increase the magnification of the electronic image formed by said converter.

Other characteristics and advantages of the invention will appear from the following description and attached drawings in which.

Figures 1, 2:
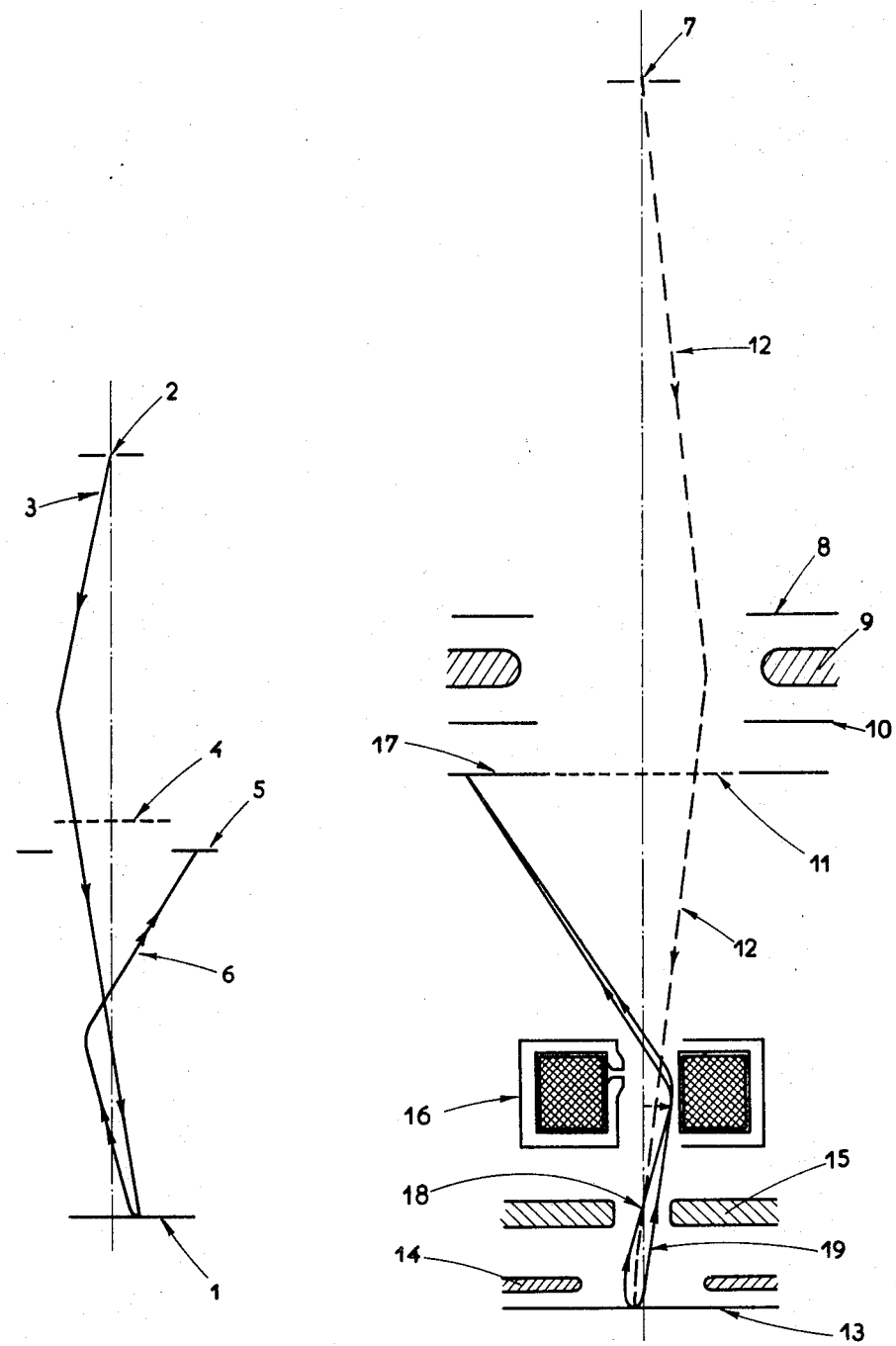
FIG. 1 is a diagram illustrating the method of the invention.
FIG. 2 is a schematic diagram of a sample construction of the device for putting into effect the method of the invention.

It is to be noted above all that this process may be used for machining materials and it is in this application that it will especially be described, but it may also serve for special treatments such as doping of semi-conducting substances as will be seen later. The object to be machined or treated is shown at 1. According to the invention, an ion beam is used that originates from a source 2 and in which one of the rays 3 is shown diagrammatically.

A model 4 is placed in the path of the beam and the ionic image of this model is formed on sample 1. This model of course is chosen so that the image formed on sample 1 exactly reproduces the form of the machining to be effected. The model may of course be larger than the image and the system of ion optics used is then a scaled down system.

Focusing control and checking of the image of model 4 on the sample is effected, according to the invention, by using the secondary electrons, emitted by the sample, to form an electronic image of that portion of the latter that is bombarded. This image is formed by means of an appropriate system of electron optics on a fluorescent screen 5 so that it may be visualized, by an electron that follows path 6 starting from the point of impact of ray 3 on sample 1.

FIG. 2 shows a schematic diagram of a device for micro-machining or treating materials according to the invention. This device consists of a ion source shown schematically by an opening 7. In the example described here the ions that are used are positive ions. This choice is by no means limiting and slight modifications would make it possible to use negative ions. However, the simplest assembly is the one corresponding to the use of positive ions.

The apparatus further comprises an electrostatic condenser formed by three electrodes 8, 9, 10 making it possible to "illuminate" a model 11 with a convergent ionic beam. This model is made for example of a perforated plate reproducing on a larger scale the form of the machining to be effected. It is to be noted that in forming the ionic image of model 11 on the sample, recesses will be formed on the latter which correspond to the perforated areas on the model. A positive replica of the latter will therefore be formed on a smaller scale. The model, which is much larger than any structure to be machined, may be easily effected for example by microengraving.

One of the rays of the ionic beam is shown at 12. The latter after going through model 11, impinges on the sample 13 to be machined.

The part which is going to be described now concerns the system of electron optic making it possible to control the focusing of the image of model 11 on sample 13.

This system consists essentially of a line converter in which the sample or piece acts as the electron emitting cathode.

This converter consists of a Wehnelt 14 and of an anode 15. Sample 13 and Wehnelt 14 are brought to a high negative voltage, of several tens kilovolts in order to obtain a good resolution of the electronic image. This voltage accelerates the secondary electrons and post-accelerates the ions by insuring the reduction and focusing of the ionic image.

It will be noted in this respect that as a result of the reduction existing between the model and its image, the ionic density at the level of model 11 is lower than at the level of the sample piece; this results in the fact that the destruction of the model, whose full parts are equally subjected to cathodic sputtering, will be much slower than the machining of the sample, also, the above mentioned post-acceleration of the ions, is produced after the passage through model 11.

The electron optical system further comprises a magnetic lens 16 functioning as a magnetic projector, in order to increase the magnification of the electronic image, thus making it possible to inspect or check very fine machining operations.

The optical system consists finally of a fluorescent screen 17 enabling visual examination of the electronic image formed by the converter. In order to facilitate the assembly, this screen was placed around model 11. Observation of this screen can be effected through a porthole, not shown, and placed laterally on the enclosure containing the entire apparatus, using any appropriate conventional optical system. Two rays 18 and 19 are shown which are part of the electronic beam originating from sample 13 going to the point of impact of ray 12 and reaching fluorescent screen 17.

It should be noted that magnetic lens 16 does not disturb the formation of the ionic image at the focal lengths are proportional to the masses of the particles. However due to the fact that this lens is located in a position where the ionic beam is large, its polar parts must be bored with a large diameter hole which implies a relatively large energizing of the coil in the lens. This energizing may be effected at low voltage from a regulated current source.

In the example of the apparatus which will be described later the focal length of the lens is several millimeters. The converter consisting of the two elements 14 and 15 and of course of the sample, forms an intermediate electronic image in the vicinity of the object focus of this lens.

It is to be noted that the device as described, makes it possible, for example, to obtain an image that is four times larger than the starting model on screen 17. With a device constructed according to the process that has just been described it is possible, for example, to machine grids having a pitch of 1μ: as a model, a grid having a pitch of 50μ and a ratio of ionic optics reduction equal to 1/50, is chosen.

Figure 3:
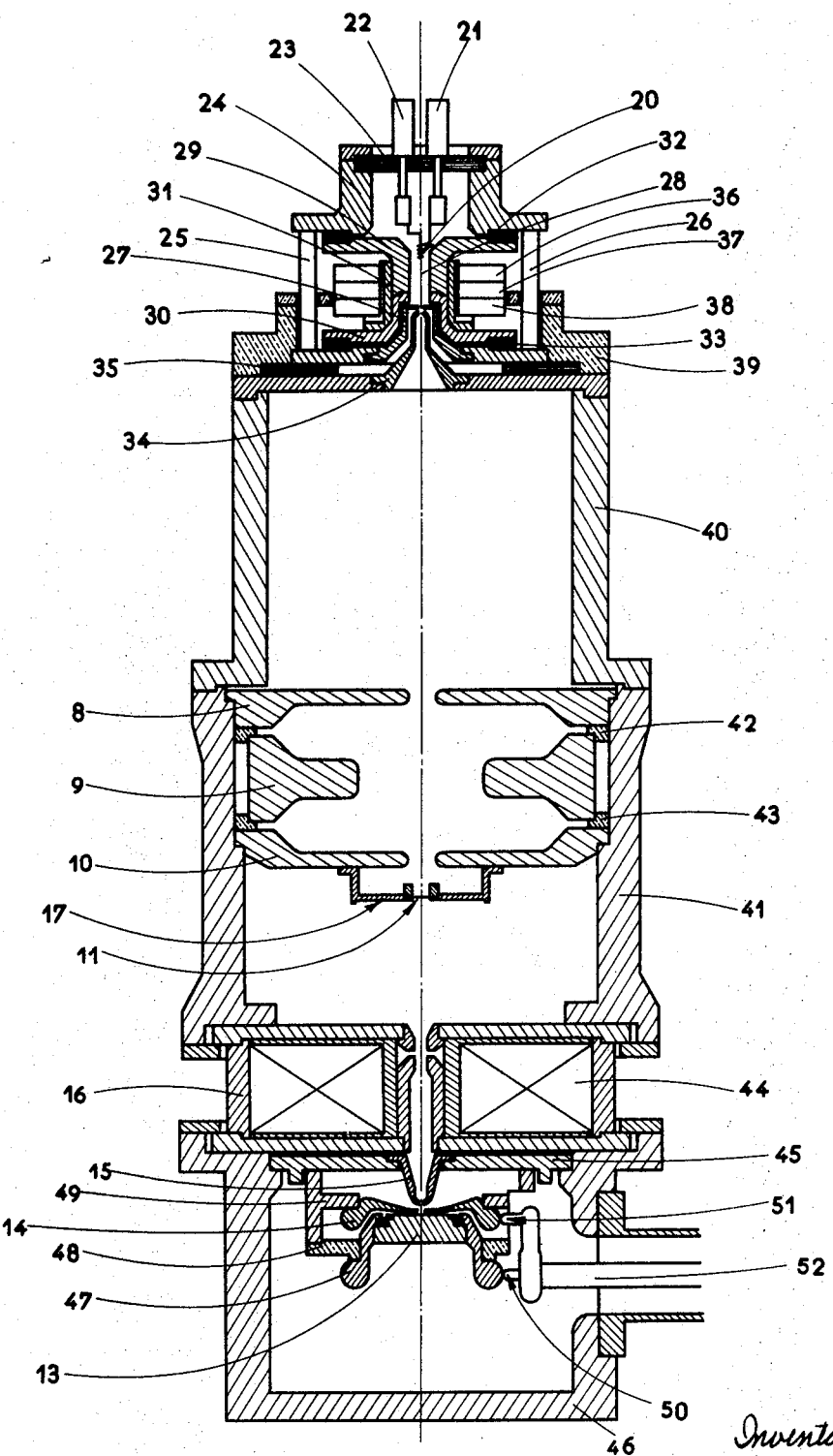
FIG. 3 is a sectional view of a device according to the invention.

FIG. 3 shows an axial cross section of an example of the apparatus according to the invention. The main elements of FIG. 2 are found again in this figure and the same reference numbers on the last figure have been assigned to these elements.

The apparatus which is essentially of a cylindrical form is composed of an assembly of a certain number of superimposed elements. It comprises on its upper part the ion source 7, consisting in an electronic arc gun and of a hot cathode. This ion gun consists of a heating element 20 fed by terminals 21 and 22 connected to a current source which is not shown. These terminals are mounted onto an insulating plate 23 fixed on the support part 24 in the form of a sleeve. This part 24 is linked to the lower part of the gun through conducting rods such as 25 and 26.

Rods 25 and 26 are linked mechanically and electrically to an electrode 27 acting as a screen for the electrons originating from the filament and raised to the potential of the latter. Zone 28 where ionization takes place, is located inside the central duct of a unit formed by two sleeves 29 and 30 joined by a centering collar 31. This unit acting as an anode is insulated electrically by means of insulating washers 32 and 33.

Below electrode 27 is placed another electrode 34 for extraction of the ions. This electrode is at the potential of the mass of the apparatus, i.e. the mass of the main part that is located below the ion gun.

Electric insulation of electrode 27 with respect to ground is insured by insulating washer 35.

The structural elements of the ion gun, particularly the rods such as 25 and 26 as well as support part 24 are raised to a positive potential of the order of 10 kv.; the difference in potential applied between filament 20 and anode 29, 30 is approximately 100 volts.

Taking these conditions into account, an electric current is established between filament 20 and anode 29, 30 and produces the ionization of the gas in zone 28. The gas may be for example argon, the inlet tube for the latter not being shown on the drawing.

In order to increase the ionization of the gas, an axial magnetic field was created using permanent annular magnets 36, 37 and 38. This field acts so as to cause the electrons to take up coiled paths thus increasing the distance travelled by the electrons and thereby the ionization of the gas. The magnets are put into place by dismantling the unit consisting of the two pieces 29 and 30.

An insulating assembly part completes the assembly and makes it possible to fix the ion gun onto the lower part of the apparatus.

In addition, air circulation has been installed in order to evacuate the power that is dissipated in filament 20 as well as in anode 29, 30.

It can be seen from the above description and by taking into account the applied potentials, that the positive ions created in space 28 are accelerated by the extraction voltage which is in the vicinity of 10 kv.

This extraction voltage can be regulated and constitutes one of the parameters which influences the focusing of the ionic image formed on the sample or piece.

Below the ion gun and co-axially with it, are fixed two cylindrical parts 40 and 41 mounted in each other's extension. Part 41 is a support for the electrostatic condenser which consists on the one hand, of two electrodes 8 and 10 that are grounded, i.e. which are part of cylinder 41 and having the form of discs that are bored in their central part. Between these two electrodes is mounted a third electrode 9 having an annular shape, that is insulated electrically from the two preceding ones by two insulating washers 42 and 43. This electrode 9 is brought to a positive potential that is in the vicinity of the one associated with the ion gun.

Below electrode 10 is mounted the unit that bears both model 11 represented by a dotted line, and fluorescent screen 17. The electronic image formed on screen 17 is observed by means of a port-hole that is not shown and that is installed in the wall of cylinder 41.

In the lower part of cylinder 41 is mounted the magnetic lens 16 with its coil 44. This lens, as already indicated enlarges the electronic image produced by the line converter located in the lower part of the device where it is maintained by a support 45 between the lower part of the magnetic lens 16 and the cylindrical base 46 forming the base of the apparatus.

Sample 13 is supported by the sample support 47 mounted on an insulating part 48.

This insulating part 48 is itself integral with an intermediate cylinder 49 which is insulating as well and fixed onto support 45. Wehnelt 14 is mounted on the cylinder.

Above the Wehnelt is placed anode 15 of the converter. The latter is fixed onto support 45 and, as a result, is at the potential of the mass. The electrical conductors 50, 51 and 52 make it possible to raise sample 13 as well as Wehnelt 14 to appropriate negative potentials. These potentials are of the order of about 50 kilovolts. The potential of Wehnelt 14 may be adjusted so as to act on the focusing of the ionic image formed on the sample. The electrostatic field in the vicinity of sample 13 is high which makes it possible to obtain a good resolution of the electronic image formed on screen 17. This field is of the order 14 kv./cm. corresponding to a resolution of $1\mu$. The focal length of the converter is approximately 1 cm.

It can be seen that the apparatus as described can be used very conveniently to carry out micro-machining operations. Its setting is easy and of great flexibility.

Focusing of the ionic image depends on the degree of ion post-acceleration, on the polarization of Wehnelt 14 and also on the excitation of condeners 8, 9, 10 whose electrostatic field slightly overlays on the area in which is located model 11. It is thus possible, through a suitable choice of the ratio of the post acceleration voltage to the initial acceleration voltage of the ions, to cancel out any image distortion.

It is also possible to carry out the focusing of the ionic image by acting, as already indicated, on the polarization of the Wehnelt and that of the condenser.

Finally it is possible to focus the electronic image formed on screen 17 by acting on the polarization of the Wehnelt and on the excitation of the magnetic lens 16.

For example by post accelerating ions, having an initial energy of 7 kev. by 46 kev., a reduction between the model and its ionic image by a factor of 50 is produced with the geometry of the converter used; structures that are 50 times smaller than the model may therefore be machined by means of this apparatus.

The magnification of the electronic image formed by converter 14, 15 and lens 16 is approximately 200 which corresponds to a magnification of 4 with respect to the model; it is completed by a magnification of 10 obtained with a sighting lens (not shown).

By way of indication, a model consisting of a grid having a pitch of $100\mu$ made it possible to engrave into a stainless steel massive support, a grid having a pitch of $2\mu$, with a sharpness far below 1 micron.

It was stated that use of the process and of the apparatus is in no way limited to machining of materials. They can be perfectly applied to doping of semi-conducting substances by ionic bombardment and it is then possible to effect a doping operation according to a perfectly determined design whose sharpness may be increased at will. This doping, i.e. introduction of impurities into the substance, may be effected directly with the bombarding ions which actually constitute said impurities. Penetration of the ions, which may be very weak for polycrystals, may be increased up to approximately 1 micron for conveniently oriented monocrystals as a result of "canalization" of the ions by the target atoms.

As an application of the process of the invention in the area of micro-machining, may be mentioned the construction of Fresnel zone lenses used for X-rays.

The process is also of interest for the construction of electronic components, especially for saw cutting of evaporated resistors into thin films so as to increase their ohmic resistance, or also for example for machining field effect transistor grooves.

In all the cases that have just been enumerated the sharpness of the treatment, in micro-machining as well as in doping, can be better than 1 micron.

It is understood that the invention is not limited to the constructions and methods and procedures described which were given only as examples.

We claim:

1. An apparatus for machining or treating materials by ionic bombardment and for continuously and simultaneously observing said materials comprising means including an ion gun for emitting ions to form a single ion beam and to treat simultaneously said material and to cause secondary electron emission upon bombardment thereof; a condenser means for producing convergence of said single ion beam originating from said gun; a model having ion opaque and transparent areas illuminated by said single ion beam; a sample support having an input side for supporting material; said model being positioned between said input side of said sample support and said condenser means; a fluorescent screen; means including a system of electron optics in the proximity of said input side of said support comprising an ion-electron line converter for forming on said fluorescent screen an electronic image of ion bombarded areas of material supported on said sample support by focusing secondary electrons emitted by the material during machining or treating by said single ion beam; and a magnetic lens means between said sample support and said fluorescent screen for projecting a magnified electronic image on said fluorescent screen.

2. An appaartus according to claim 1 having an axis along which said ion beam travels and in which the fluorescent screen consists of a fluorescent plate, provided with a central recess for passage of said ion beam, arranged perpendicularly to said axis, integral with one of said electrodes, and in the form of a disc.

3. An apparatus according to claim 2 in which the model is placed across the recess provided on the screen.

4. An apparatus according to claim 1 in which the ion gun comprises an ion source having a positive potential, an extraction electrode coupled to a part of the apparatus at a reference potential which differs from said positive potential, and means for supplying said positive and said reference potentials.

5. An apparatus according to claim 1 in which the condenser means consists of an annular electrode having a potential close to that of the ion source and of two electrodes, each having essentially the form of a disc and each having a central recess, arranged on either side of the annular electrode, and means for supplying said potential close to that of said ion source.

6. An apparatus according to claim 1 in which the converter consists of a Wehnelt of a plane structure of very small thickness placed in the immediate vicinity of the material forming a sample and raised together with the sample to a high negative voltage, an anode of generally conical shape bored at its top and linked electrically to a reference potential, and means for supplying said high negative potential and the last-mentioned reference potential.

7. An apparatus according to claim 1 having an axis along which said ion beam travels and in which the magnetic projector consists of a magnetic lens placed on said axis of the apparatus between said screen and said converter.

References Cited

UNITED STATES PATENTS

| | | | |
|---|---|---|---|
| 3,225,192 | 12/1965 | Katagiri et al. | 250—49.5 |
| 3,221,133 | 11/1965 | Kazato et al. | 250—49.5 |
| 2,345,080 | 3/1944 | Ardenne | 250—49.5 |
| 2,267,752 | 12/1941 | Ruska et al. | 250—49.5 |
| 2,267,714 | 12/1941 | Borries et al. | 250—49.5 |

OTHER REFERENCES

Long: "A Theoretical Assessment of the Possibility of Selected-area Mass-spectrometric Analysis Using a Focused Ion Beam," Brit. J. of Appl. Phys., 1965, vol. 16, pp. 1277–1284.

JOHN H. MACK, Primary Examiner

S. S. KANTER, Assistant Examiner

U.S. Cl. X.R.

204—298; 219—69; 250—49.5